US012389173B2

(12) United States Patent
Schepker et al.

(10) Patent No.: US 12,389,173 B2
(45) Date of Patent: Aug. 12, 2025

(54) PREDICTING GAIN MARGIN IN A HEARING DEVICE USING A NEURAL NETWORK

(71) Applicant: Starkey Laboratories, Inc., Eden Prairie, MN (US)

(72) Inventors: Henning Schepker, Oldenburg (DE); Sina Miran, Silver Springs, MD (US); Lior Weizman, Tel Aviv (IL); Liron Pollak, Ness Ziona (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 240 days.

(21) Appl. No.: 18/204,014

(22) Filed: May 31, 2023

(65) Prior Publication Data

US 2023/0388724 A1 Nov. 30, 2023

Related U.S. Application Data

(60) Provisional application No. 63/347,160, filed on May 31, 2022.

(51) Int. Cl.
*H04R 25/00* (2006.01)

(52) U.S. Cl.
CPC ......... *H04R 25/507* (2013.01); *H04R 25/453* (2013.01); *H04R 25/604* (2013.01); *H04R 2430/01* (2013.01)

(58) Field of Classification Search
CPC .. H04R 25/507; H04R 25/453; H04R 25/604; H04R 2430/01
See application file for complete search history.

(56) References Cited

U.S. PATENT DOCUMENTS

| | | | | | |
|---|---|---|---|---|---|
| 6,134,329 | A * | 10/2000 | Gao | ........................ | H04R 25/70 381/60 |
| 7,738,667 | B2 | 6/2010 | Bramsløw | | |
| 8,351,613 | B2 | 1/2013 | Merks | | |
| 8,942,398 | B2 | 1/2015 | Salvetti | | |
| 10,206,048 | B2 | 2/2019 | Petersen | | |
| 11,184,714 | B2 | 11/2021 | Guo | | |
| 2017/0156009 | A9 | 6/2017 | Natarajan | | |
| 2017/0311095 | A1 | 10/2017 | Fitz | | |

FOREIGN PATENT DOCUMENTS

WO WO 2021242571 A1 12/2021

OTHER PUBLICATIONS

U.S. Appl. No. 18/119,357, filed Mar. 9, 2023, Mirbagheri.

* cited by examiner

*Primary Examiner* — Mark Fischer
(74) *Attorney, Agent, or Firm* — Mueting Raasch Group

(57) ABSTRACT

A hearing device includes a microphone that produces an audio input signal and a loudspeaker that outputs an amplified audio signal into an ear canal. A signal processing path is coupled to the microphone and the loudspeaker. The signal processing path includes a deep neural network configured to predict an instantaneous gain margin of the hearing device based on a set of inputs. The set of inputs includes a first parameter of the audio input signal, a second parameter of the amplified audio signal, and a gain of the signal processing path. A feedback reduction module of the device receives the predicted instantaneous gain margin and adjusts feedback reduction parameters to reduce an onset of feedback in the hearing device.

20 Claims, 6 Drawing Sheets

PREDICTING GAIN MARGIN IN A HEARING DEVICE USING A NEURAL NETWORK

RELATED PATENT DOCUMENTS

This application claims the benefit of U.S. Provisional Application No. 63/347,160, filed on May 31, 2022, which is incorporated herein by reference in its entirety.

SUMMARY

This application relates generally to ear-level electronic systems and devices, including hearing aids, personal amplification devices, and hearables. In one embodiment, a hearing device includes a microphone that produces an audio input signal and a loudspeaker that outputs an amplified audio signal into an ear canal. A signal processing path is coupled to the microphone and the loudspeaker. The signal processing path includes a deep neural network configured to predict an instantaneous gain margin of the hearing device based on a set of inputs. The set of inputs includes a first parameter of the audio input signal, a second parameter of the amplified audio signal, and a gain of the signal processing path. A feedback reduction module of the device receives the predicted instantaneous gain margin and adjusts feedback reduction parameters to reduce an onset of feedback in the hearing device.

In another embodiment, a method involves receiving an audio input signal from a microphone of a hearing device and receiving an amplified audio signal sent to a loudspeaker of the hearing device. The method further involves determining a gain of a signal processing path that outputs the amplified audio signal based on the audio input signal. A set of inputs of the device is input into a deep neural network. The set of inputs includes a first parameter of the audio input signal, a second parameter of the amplified audio signal, and the gain of the signal processing path. The deep neural network outputs a predicted instantaneous gain margin in response to the set of inputs. The predicted instantaneous gain margin is used to reduce an onset of feedback in the hearing device.

In another embodiment, a method comprises simulating the following: first parameters of audio input signal from a microphone of a hearing device over a time period; second parameters of an amplified audio signal sent to a loudspeaker of the hearing device over the time period; gains of a signal processing path that outputs the amplified audio signal from the hearing device based on the audio input signal over the time period; and adaptive filter coefficients of an adaptive feedback controller of the hearing device over the time period. A computing system repeatedly performs an optimization of the neural network until an error criterion is reached. The optimization includes inputting the first parameters, the second parameters, the gains, and the adaptive filter coefficients into a deep neural network to obtain an output that estimates the gain margin prediction; determining an error in the gain margin prediction based on the output and a reference; and using the error to update the deep neural network.

The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
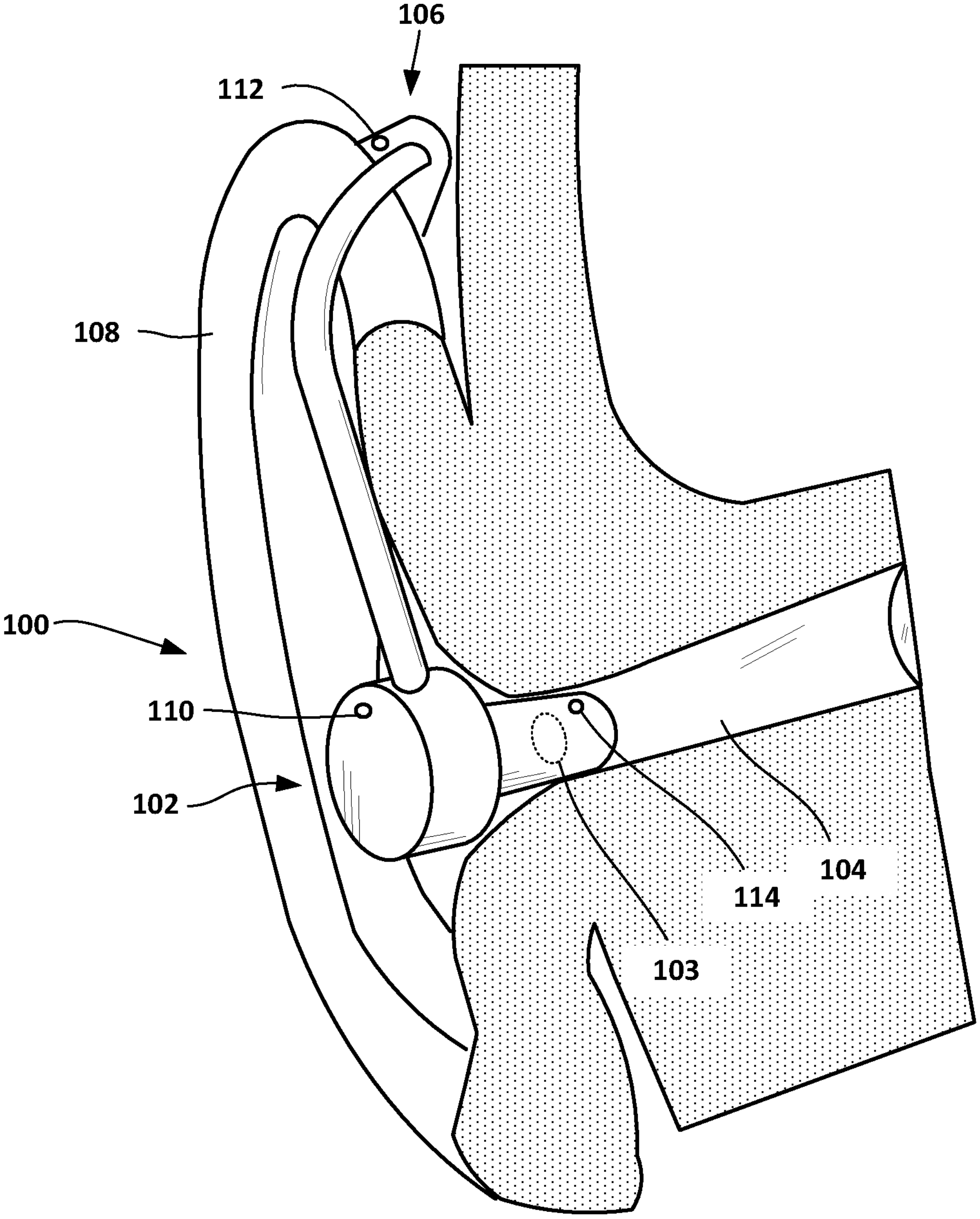
FIG. 1 is an illustration of a hearing device according to an example embodiment.

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Embodiments described herein relate to apparatuses and methods for estimating the gain margin in a hearing device. Gain margin refers to the amount of gain that can be applied in addition to the current gain applied to an audio processing path until the hearing or audio becomes unstable, e.g., due to feedback. The estimation of gain margin can be used control/reduce feedback in these devices.

The gain margin is a useful measure of how close to instability the hearing aid is operating. Gain margin can be understood as a decibel value between −infinity and +infinity, where negative gain margins indicate instability of the hearing aid and positive values indicate a stable hearing aid operation. An unstable hearing aid is characterized by audible distortions and artifacts that can be best described as howling, chirping, or whistling. The term "feedback distortions" is used herein to refer to these artifacts, as well as other artifacts that are not as apparent as chirping. howling, etc. Note that gain margin can be expressed as a function of frequency, e.g., due to a non-uniform frequency response of the feedback path or non-uniform gain in the hearing aid.

In various embodiments, a neural network, such as a deep neural network, predicts the instantaneous gain margin from signals and other data available in the hearing aid. Those signals and data may include any combination of the microphone signal, the receiver (loudspeaker) signal, the current gain, and filter coefficients from an adaptive feedback canceller. This deep neural network is trained offline to predict the gain margin under varying conditions. The training targets to the neural network can be computed analytically in simulations from data that may not be available in the hearing aid during runtime. The simulations may be obtained from several audio examples, as well as other measured data, such as feedback path frequency response, applied gain, actual gain margin, etc. The predicted gain margin from the deep neural network is utilized to decide on the risk of feedback distortions and change parameters in the feedback reduction algorithms, e.g., reduce the gain of the hearing aid or modify the step-size of an adaptive feedback cancellation algorithm.

There are existing methods for measuring the gain margin for hearing aids and detecting/reducing feedback distortions of the hearing aid. However, it is believed that deep neural networks are not currently being used to predict the instantaneous gain margin during runtime. Nor are the outputs of such a network used to adjust parameter related to feedback reduction in the hearing device to reduce the onset of or the risk of feedback distortions. Such an implementation is expected to work well with current hearing aid designs, and has the potential to provide improved chirp resilience and comfort for the patient.

In FIG. 1, a diagram illustrates an example of an ear-wearable device 100 according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically and/or acoustically coupled to the internal portion 102. The in-ear portion 102 may include an acoustic transducer 103, although in some embodiments the acoustic transducer may be in the external portion 106, where it is acoustically coupled to the ear canal 104, e.g., via a tube. The acoustic transducer 103 may be referred to herein as a "receiver," "loudspeaker," etc., however could include a bone conduction transducer. One or both portions 102, 106 may include an external microphone, as indicated by respective microphones 110, 112.

The device 100 may also include an internal microphone 114 that detects sound inside the ear canal 104. The internal microphone 114 may also be referred to as an inward-facing microphone or error microphone. Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 shows one example of a hearing device, often referred to as a hearing aid (HA), the term hearing device of the present disclosure may refer to a wide variety of ear-level electronic devices that can aid a person with or without impaired hearing. This includes devices that can produce processed sound for persons with normal hearing. Hearing devices include, but are not limited to, behind-the-ear (BTE), in-the-ear (ITE), in-the-canal (ITC), invisible-in-canal (ITC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

Acoustic feedback occurs due to the acoustic coupling of the hearing aid receiver 103 and one of the hearing microphones 110, creating a closed loop system that becomes unstable once the feedback reaches a threshold level. Note that feedback can occur between any microphone and the receiver 103, and the selection of microphone 110 in subsequent diagrams is not meant to limit the embodiments to an external microphone on an earpiece.

To reduce acoustic feedback, two different approaches are generally used. In the first approach, adaptive feedback cancellation can be used that estimates a digital copy of the acoustic feedback path using the receiver and microphone signals of the hearing aid. This estimate of the feedback path is typically found using an adaptive filter. The feedback component estimate is subsequently subtracted from the microphone signal. This subtraction of the feedback component estimate occurs in the audio processing path between the microphone and receiver.

One parameter that can have significant effects on adaptive feedback cancellation is the step-size, or learning rate, of the adaptive filter used to estimate the acoustic feedback path. This learning rate provides a trade-off between fast convergence but larger estimation error for high learning rates and slow convergence but more accurate estimation for slower learning rates. The choice of the learning rate typically depends on the signal of interest. For example, for signals that are highly correlated over time (e.g., tonal components in music or sustained alarm sounds) a slower adaptation rate is preferred, while for other signals faster adaptation rates could be used. A feedback cancellation adaptive filter may exhibit feedback distortions due to a significant change of the acoustic feedback path while the adaptive feedback cancellation algorithm has not yet adapted to the new acoustic path. When the adaptive feedback cancellation algorithm is mal-adapting to strongly self-correlated incoming signals this results in so-called entrainment.

In a second approach for feedback reduction, the gain of the hearing aid is reduced whenever feedback distortions are detected. This reduction may either be broadband or frequency-dependent. In the latter case, the gain may be reduced only in sub-bands or using notch-filters. This is generally a reactive approach as it may require feedback distortions to reach audibility to detect the distortions. Because the mitigation occurs after the detection, this approach may still introduce audible distortions, even if significant chirping and other more severe effects can be mitigated.

One approach to solving this problem is to combine both feedback cancellation and gain reduction in a way that is not computationally expensive. This can be done by carefully choosing a static learning rate of the adaptive filter that provides the best engineering trade-off between adaptation to path changes and accurate estimation. In this approach, the hearing aid gain may also be limited to not exceed predetermined thresholds.

Embodiments described herein solve the above problem by making it possible to automatically change the step-size of the adaptive feedback canceller and/or the gain of the hearing aid when the risk of chirping is high, e.g., when the gain margin is close-to zero or even negative. To accomplish this, a deep neural network (DNN) is trained to predict the gain margin of the hearing aid during run-time operation from signals accessible in the hearing aid during normal operation (e.g., microphone signal, receiver signal, hearing aid gain, feedback cancellation filter coefficients). While training of the DNN requires significant computational resources, once trained, it can be transferred to a memory of a hearing device where it can operate with low computational requirements, such as in devices with DNN hardware acceleration.

Figure 2:
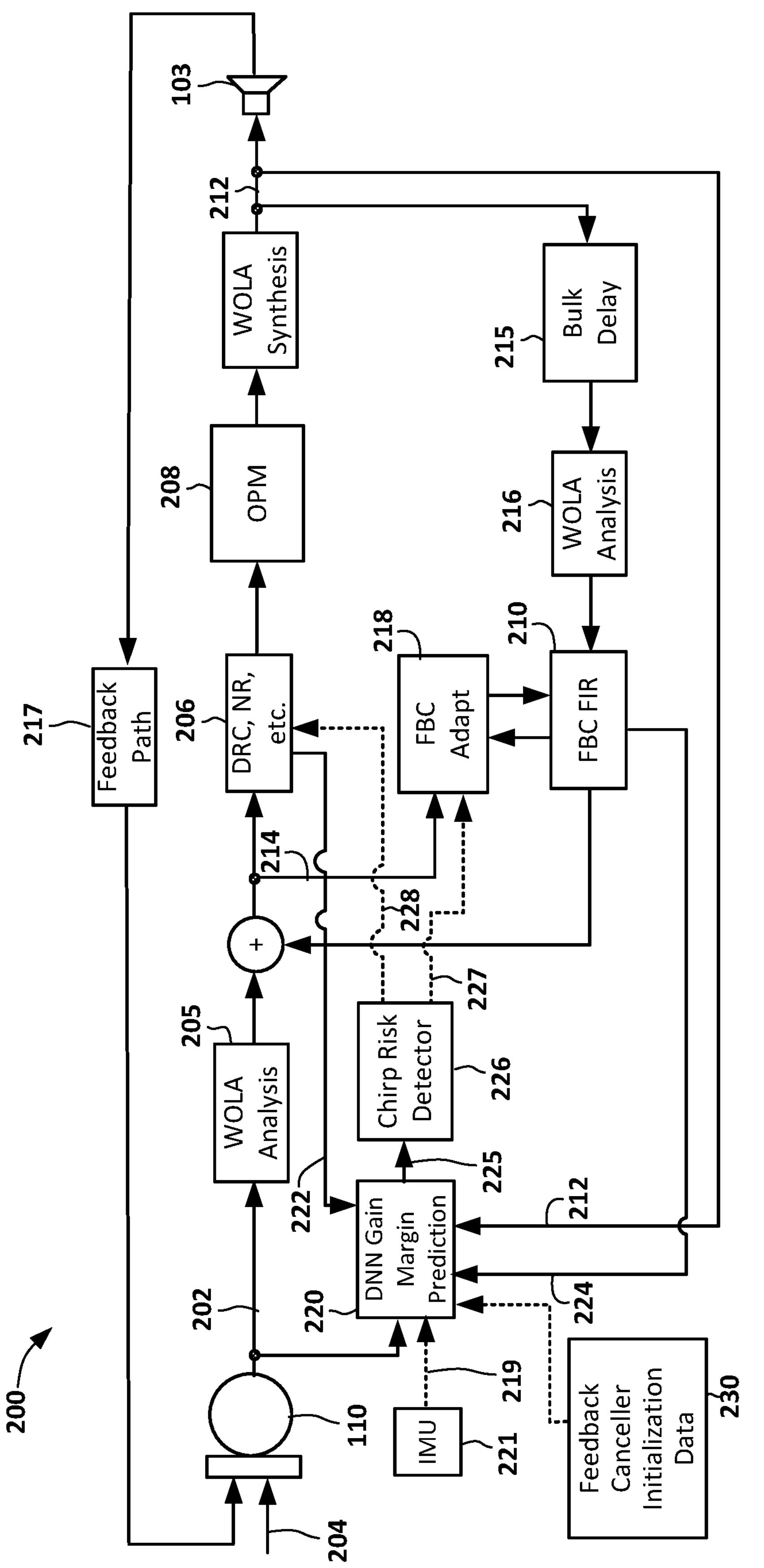
FIG. 2 is a block diagram of a processing path according to an example embodiment.

In FIG. 2, a block diagram shows a simplified view of a hearing device feedback processing path 200 according to an example embodiment. A microphone 110 receives external sound 204 and produces an input audio signal 202 in response. A weighted overlap add (WOLA) analysis module 205 decomposes the input audio signal 202 into sub-band signals in the frequency domain. Additional processing is indicated by processing block 206, which may include dynamic range compression (DRC), noise reduction (NR), etc. An output phase modulation (OPM) block 208 is used to adjust the phase of the output of the processing block 206 in the feedback loop to reduce entrainment of the feedback filter 210. In this example, the filter 210 is a finite impulse response (FIR) filter. An adaptive algorithm, such as the least mean squares (LMS), normalized LMS (NLMS), etc. is used to tune the FIR coefficients based on the correlation of the input error signal 214 and the output of the system 212. Other filters may be used besides a FIR filter, such as an infinite impulse response (IIR) filter without departing from the scope of the present subject matter.

A feedback cancellation (FBC) adaptation module 218 implements update rules for the adaptive filtering algorithm, e.g., it updates the digital copy of the acoustic feedback path 217. This update can be based on the instantaneous gradient of the squared error signal for LMS and NLMS. The FBC adaptation module 218 changes coefficients of the adaptive filter and may be configured to make other changes, such as increasing or decreasing step size.

A bulk delay line 215 is inserted between the output of the system 212 and the FIR input. The bulk delay line 215 is used in cases where the FIR filter 210 is not long enough to accommodate the feedback path length, therefore becomes truncated. The delayed output is decomposed back into the subbands via another WOLA analysis block 216 before being input to the FIR filter 210.

As noted above, conventional methods of detective feedback may use excessive computing resources to be practically implemented and/or be less effective in detecting the onset of feedback. In this example, a DNN gain margin predictor 220 is used to predict feedback conditions by estimating a current gain margin. The DNN gain margin predictor 220 takes a number of inputs based on various signals, including an audio input signal 202, the amplified audio signal 212. The audio input signal 202 originates from the outward facing microphone signal (e.g., external microphones 110, 112 shown in FIG. 1). An audio signal from an inward facing microphone (e.g., internal microphone 114 shown in FIG. 1) can be utilized as an additional input to the DNN gain margin predictor 220 to improve the prediction of the instantaneous gain margin for the outward facing microphone. Generally, parameters/data derived from these signals 202, 212, such as WOLA frames, may be input to the DNN gain margin predictor 220 instead of the digital representation of the signals themselves. Other data that can be used by DNN gain margin predictor 220 includes a gain 222 of the signal processing path and coefficients 224 of the adaptive filter 210. The DNN gain margin predictor 220 predicts a current/instantaneous gain margin 225 of the hearing device based on these inputs, which is used by chirp risk detector 226 to determine current risk of feedback distortion. The DNN gain margin predictor 220 may also be trained on other inputs to make this determination, such as signal 219 from inertial measurement unit (IMU) 221.

The chirp risk detector 226 outputs a value 227 that can be used by the FBC adaptation module 218 to alter behavior of the adaptive filter 210, e.g., changing a step size. The chirp risk detector 226 may also or instead output a second value 228 to the processing block 206 which can be used to reduce the gain of the device, thereby reducing a power of the output signal 212. This gain reduction may be frequency-specific, e.g., reducing power in one or more bands of the audio signal, while other bands are unaffected.

Figure 3:
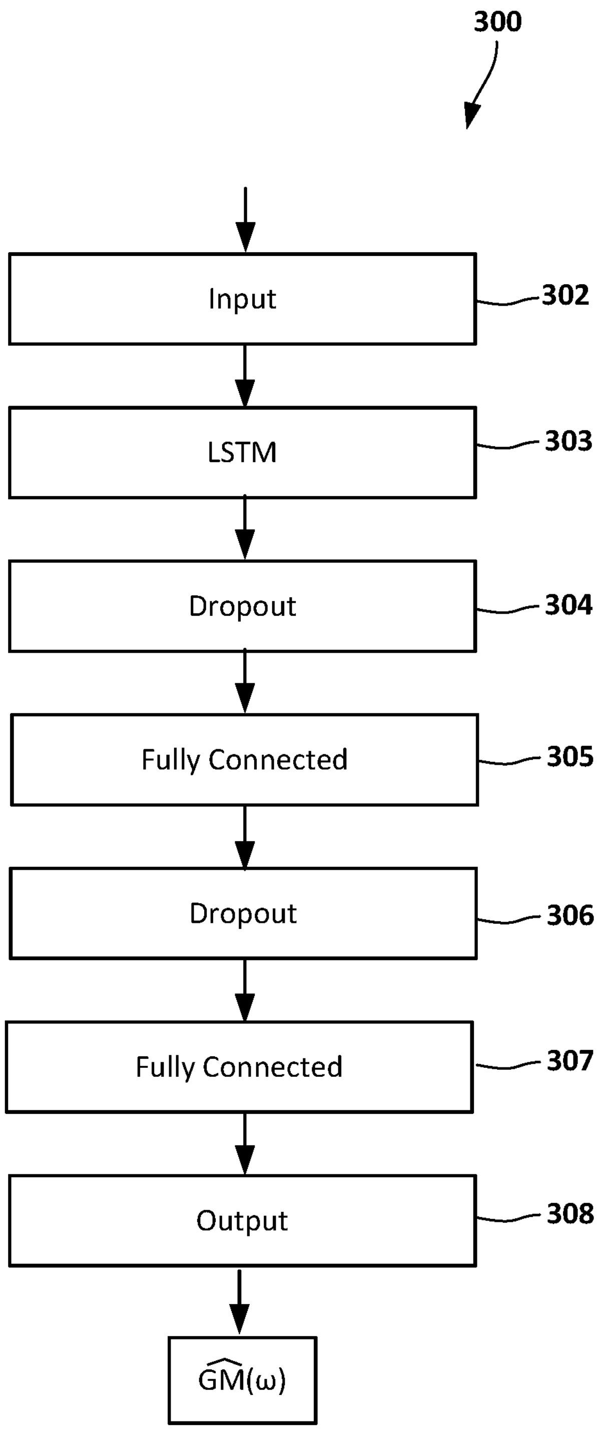
FIG. 3 is a diagram of a recurrent deep neural network cells according to an example embodiment.

In FIG. 3, a block diagram shows an example of a DNN model 300 that may be used within the DNN gain margin predictor 220 according to an example embodiment. Structure of the neural network layers of the DNN model 300 include an input layer 302, a long short-term memory (LSTM) layer 303, a first dropout layer 304, a first fully connected layer 305, a second dropout layer 306, a second fully connected layer 307, and an output layer 308. Generally, the dropout layers 304, 306 have some neurons disabled during training to prevent overfitting of the data.

The inputs 302 to the model 300 is a 2D matrix of size N-blocks×N-features, which may include data from any combination of the following sources: the microphone signal 202, the receiver signal 212, the hearing device gain 222, and the adaptive filter coefficients 224. In some embodiment, the inputs 302 may also include an IMU output 219, which may include measurements from accelerometers, gyroscopes, and/or magnetometers. The outputs 219 of the IMU may be combined, e.g., adding the magnitude of the acceleration in three directions and/or may be converted to frequency domain information.

If the raw digitized data streams were used inputs to the model 300, a typical 2D matrix of input data for a 32-second audio signal segment could be of size 20,000×200, where the 200-dimensional feature features contain the WOLA coefficients of the microphone signal, the WOLA coefficients of the receiver signal, feedback canceller coefficients and the hearing aid gain. Instead of using the raw data, an input preprocessor can calculate the WOLA coefficients for part of the data (e.g., microphone signal, receiver signal) before using them as an input for the DNN. Because the DNN input data comes from different sources (microphone, receiver, hearing device gain, filter coefficients, IMU), the DNN inputs may be synchronized, e.g., by appropriate up and down sampling or generation at the correct sampling intervals via the preprocessor.

After the pre-processing of the input data is complete, the data inputs are applied to the network model 300. The model parameters of the DNN (e.g., weights and biases) are predetermined and loaded into the device. These model parameters can be found using supervised learning offline, e.g., in a simulation environment. The model parameters are optimized, e.g., using back-propagation with gradient descent, with a weighted mean-squared error (MSE) as a loss function for the model training. The output 308 from the model 300 is the predicted gain margin, either as a single broadband gain margin or per sub-band gain margin.

Figure 4:
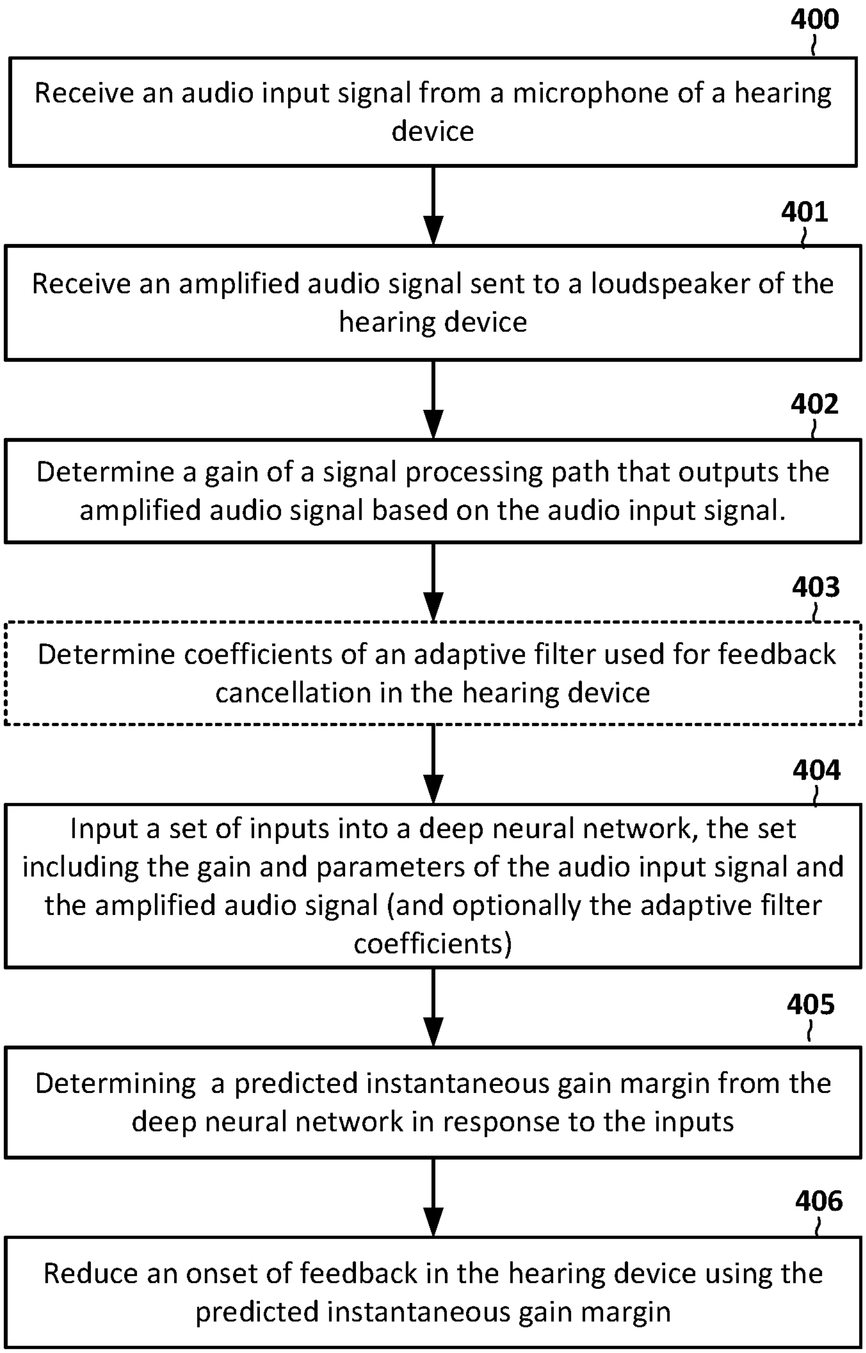
FIG. 4 is a flowchart of a method according to an example embodiment.

As shown in FIG. 4, a method using a DNN for gain prediction in a hearing device is shown. The method involves receiving 400 an audio input signal from a microphone of a hearing device and receiving 401 an amplified audio signal sent to a loudspeaker of the hearing device. The system determines 402 a gain of a signal processing path that outputs the amplified audio signal based on the audio input signal. Optionally, the system may also determine 403 coefficients of an adaptive filter used for feedback cancellation in the hearing device.

A set of inputs is input 404 into a DNN. The set of inputs includes: a first parameter of the audio input signal, a second parameter of the amplified audio signal, and the gain of the signal processing path. The inputs may also include the coefficients of the adaptive filter. Responsive to the set of inputs, the DNN determines 405 a predicted instantaneous gain margin. The predicted instantaneous gain margin is used to reduce 406 an onset of feedback in the hearing device, e.g., by adjusting a step size of the adaptive filter, and/or changing a gain of the audio path. Note that this reduction of the onset of feedback need not eliminate all feedback or its distortion effects, but may at least limit the time that the effects are audible and/or reduce a severity of feedback distortion in the event that feedback cannot be completely avoided.

Figure 5:
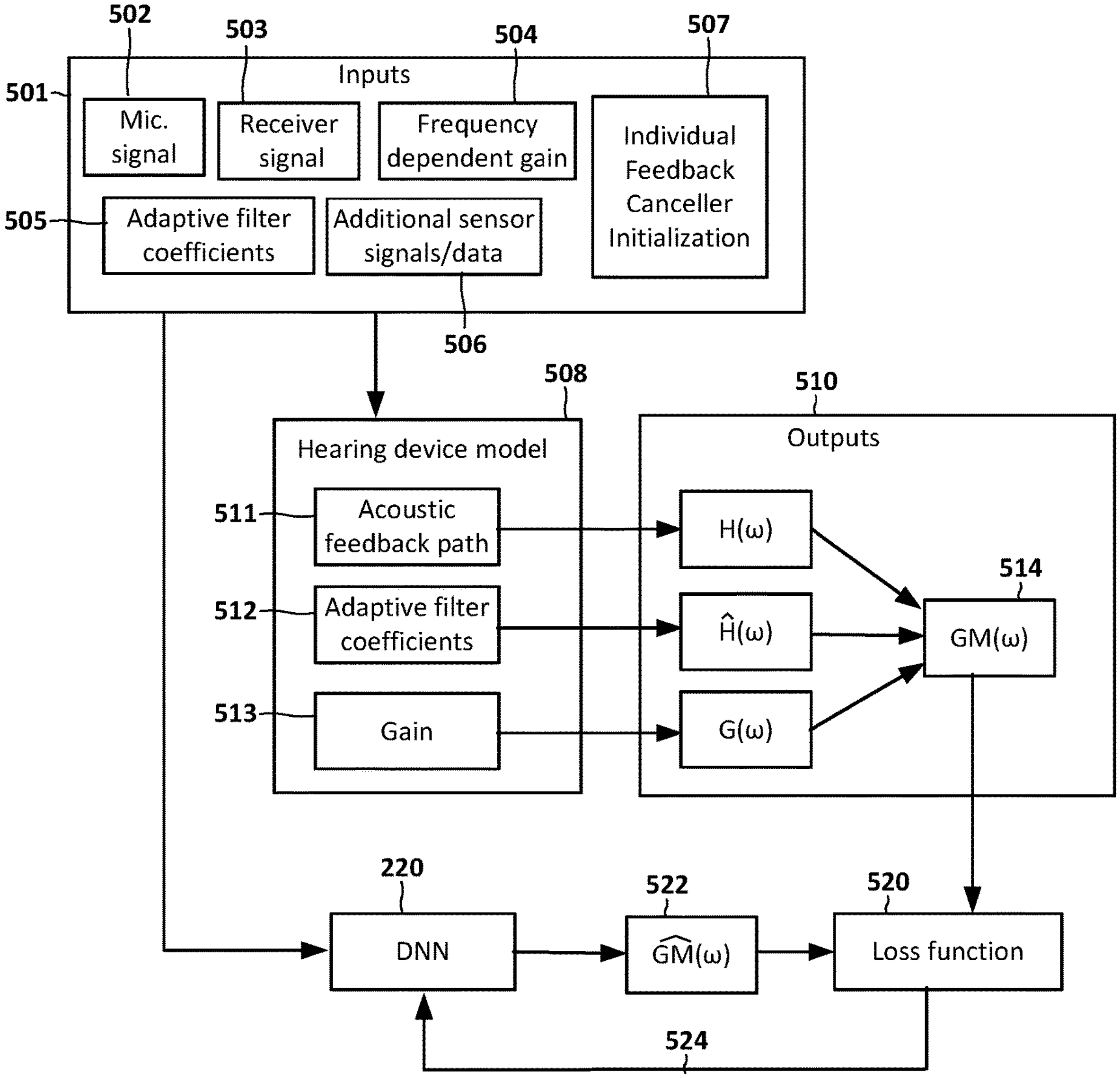
FIG. 5 is a block diagram illustrating training of neural networks according to an example embodiment.

The DNN is trained offline to predict the gain margin of the hearing device. The training utilizes a simulation framework of the hearing device that simulates the acoustic conditions under which the hearing device is operating. An example of training a DNN 220 is shown in FIG. 5. During training of the DNN the network, a data set is collected that includes several pairs of example inputs 501 for hearing device simulations that generate outputs 510. The example inputs 501 include: microphone signal 502 (broadband, or in different frequency resolution obtained from a filterbank); a receiver signal 503 (broadband, or in different frequency resolution obtained from a filterbank); frequency/sub-band-dependent hearing device gain 504, feedback canceller adaptive filter coefficients 505, and additional sensor signals/data 506 (e.g., IMU).

The corresponding output examples 510 are computed from a model 508 of the hearing device. The model 508 includes the acoustic feedback path model 511, the adaptive filter coefficients 512, and the hearing aid gain 513. The gain margin 514 GM(ω) is found using Equation (1) below, where G(ω) is the hearing device gain 513 (including dynamic range control, noise reduction, and other gain-modifying features), H(ω) is the magnitude response of the modeled feedback path 511 and $\hat{H}(\omega)$ is the magnitude response of the estimated feedback path obtained from the adaptive feedback cancelling filter coefficients 512. In the case where only a single gain margin value is desired as target, the operation shown in Equation (2) is applied.

$$GM(\omega) = G(\omega)\left(H(\omega) - \hat{H}(w)\right) \tag{1}$$

$$GM = \min_{\omega} GM(\omega) \tag{2}$$

A loss function 520 for training the DNN 220 takes the modeled gain margin 514 and a predicted gain margin 522 from the DNN 220. The loss function 520 may use a mean-squared error (MSE) between the predicted gain margin 522 and ground truth gain margin 514. The loss function 520 may more specifically use a weighted MSE wherein the weighting emphasizes GM values close to zero, e.g., −3 dB to +3 dB and gradually deemphasizes GM values further away from zero. An output 524 of the loss function 520 is fed back through the DNN 220 to update the DNN 220 weights and biases, e.g., using gradient descent, Adam optimization, etc.

Once trained, the DNN 220 is used in an operational hearing device, such as shown in the diagram of FIG. 2. In FIG. 2, the output of the DNN 220 is input to a chirp risk detector 226. The chirp risk detector 226 aims at controlling the step-size of the adaptive filter 210 based on the predicted gain margin. In one embodiment, the chirp detector 226 may perform a thresholding operation. For example, when the predicted gain margin is smaller than zero, the step-size of the adaptive filter 210 is increased and/or the hearing aid gain is reduced to prevent feedback distortions. When the gain margin increases to greater than zero, the step-size of the adaptive filter 210 is decreased and/or the hearing aid gain may be increased up to a previously set value.

In another embodiment, the chirp detector 226 may perform more complex control operations. For example, the step-size of the adaptive filter 210 can be gradually increased as the gain margin approaches zero. Additionally or instead, the hearing aid gain can gradually be reduced to maintain a desired gain margin value. As the gain margin increases in the positive direction above zero, the step-size of the adaptive filter 210 can be gradually decreased and/or the hearing aid gain can gradually be increased up to some previously set value.

In a preferred embodiment the chirp detector 226 will gradually increase the step-size as the estimated gain margin approaches zeros. Additionally, it will reduce the hearing aid gain when the gain margin becomes negative. As soon as the estimated gain margin becomes positive again, the step-size is reduced to its previously set value, while the hearing aid gain maintains reduced for an additional short period of time, e.g., 20 ms or 30 ms, or 40 ms, or 60 ms, and is gradually increased up to some previously set value.

In another embodiment, the DNN 220 (see FIG. 2) takes additional input information 230 about the individual acoustic feedback path 217 that is obtained from a measurement on the ear using a so-called feedback canceller initialization measurement and stored in a device memory. The information 230 about the individual feedback paths can be either the time-domain impulse response of the acoustic feedback path 217, or a (frequency-domain) transformed version if the impulse response, or preferably the optimal feedback canceller coefficients in the WOLA domain that model this individual impulse response. This is also seen in FIG. 5, in which individual feedback canceller initialization 507 is shown as an additional input 501 to the DNN 220.

In Table 1 below, additional details are provided regarding configuration of the neural networks described herein. Note that these details represent what is expected to be a best mode of implementation, but it is not intended to limit the claims to only these implementations.

TABLE 1

| | |
|---|---|
| Network Topology and Use of Recurrent Units | Input −> LSTM −> Dropout −> Fully Connected −> Dropout −> Fully connected −> Output; in other embodiments, a GRU layer could be used instead of LSTM |
| Data format for inputs and outputs | The microphone and receiver signals can be converted to multiple-band WOLA magnitude features extracted from frames of the digitized signals. The gain and adaptive filter coefficient values can be input directly or remapped, e.g., to 4 or 8-bit integer values. Other streaming data, e.g., IMU output, can be used directly or converted to the frequency domain, e.g., using fast Fourier transform. |
| Propagation function | Multiplication and addition of weights |
| Transfer/Activation function: | No activation function required |
| The learning paradigm | Supervised learning to minimize error between modeled and predicted gain margin. |
| Training dataset | Multiple hours of speech signals (80% train-10% test-10% test). The feedback path impulse responses are sampled randomly from a dataset of static impulse responses (80% train-10% test-10% test) measured from different devices. |
| Cost function | MSE loss or weighted MSE loss |
| Starting values | Random values |

Figure 6:
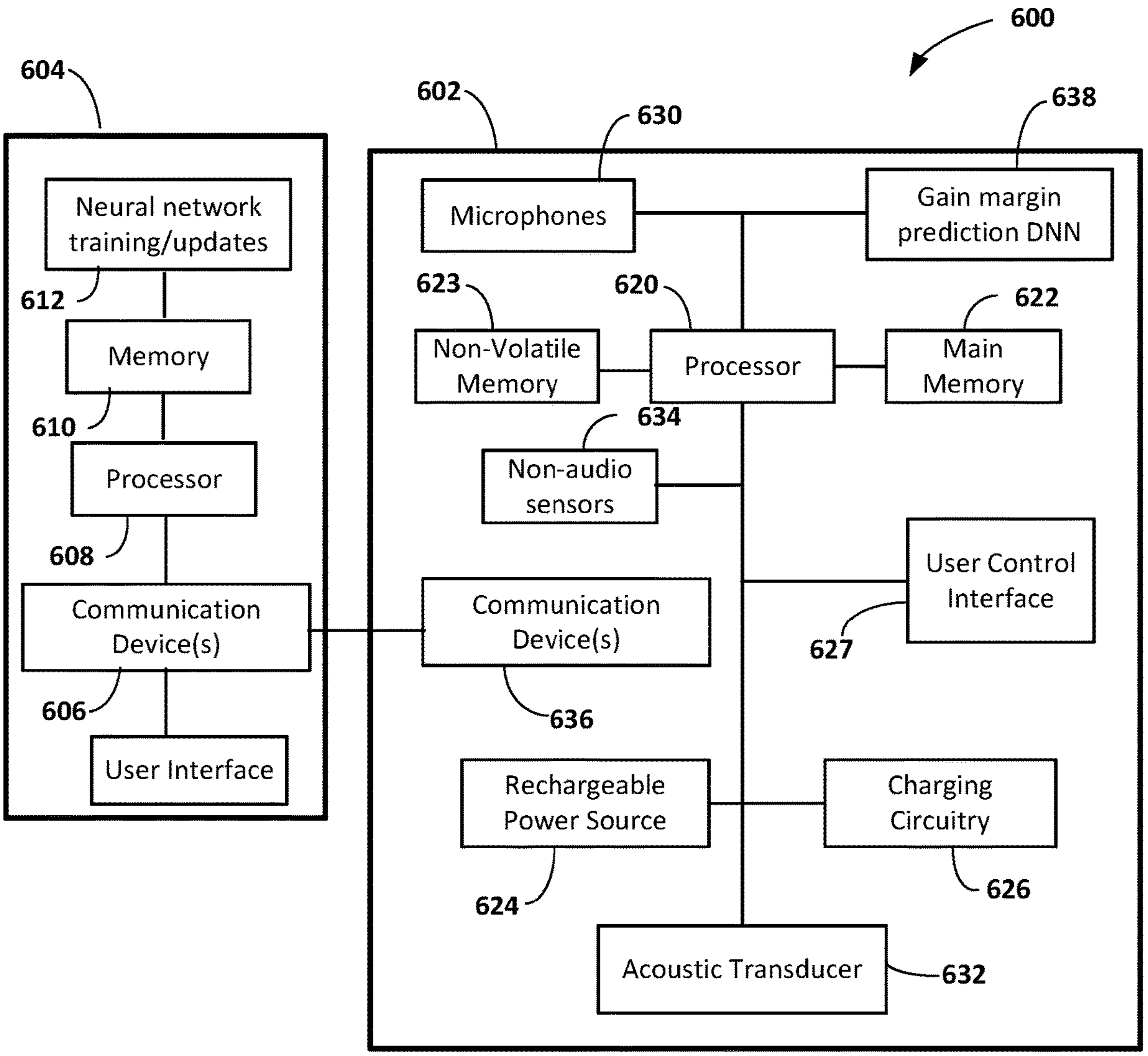
FIG. 6 is a block diagram of a hearing device and system according to an example embodiment.

In FIG. 6, a block diagram illustrates a system and ear-worn hearing device 600 in accordance with any of the embodiments disclosed herein. The hearing device 600 includes a housing 602 configured to be worn in, on, or about an ear of a wearer. The hearing device 600 shown in FIG. 6 can represent a single hearing device configured for monaural or single-ear operation or one of a pair of hearing devices configured for binaural or dual-ear operation. The hearing device 600 shown in FIG. 6 includes a housing 602 within or on which various components are situated or supported. The housing 602 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 600 includes a processor 620 operatively coupled to a main memory 622 and a non-volatile memory 623. The processor 620 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 620 can include or be operatively coupled to main memory 622, such as RAM (e.g., DRAM, SRAM). The processor 620 can include or be operatively coupled to non-volatile (persistent) memory 623, such as ROM, EPROM, EEPROM or flash memory. As will be described in detail hereinbelow, the non-volatile memory 623 is configured to store instructions that facilitate using estimators for eardrum sound pressure based on SP measurements.

The hearing device 600 includes an audio processing facility operably coupled to, or incorporating, the processor 620. The audio processing facility includes audio signal processing circuitry (e.g., analog front-end, analog-to-digital converter, digital-to-analog converter, DSP, and various analog and digital filters), a microphone arrangement 630, and an acoustic transducer 632 (e.g., loudspeaker, receiver, bone conduction transducer). The microphone arrangement 630 can include one or more discrete microphones or a microphone array(s) (e.g., configured for microphone array beamforming). Each of the microphones of the microphone arrangement 630 can be situated at different locations of the housing 602. It is understood that the term microphone used herein can refer to a single microphone or multiple microphones unless specified otherwise.

At least one of the microphones 630 may be configured as a reference microphone producing a reference signal in response to external sound outside an ear canal of a user. Another of the microphones 630 may be configured as an error microphone producing an error signal in response to sound inside of the ear canal. The acoustic transducer 632 produces amplified sound inside of the ear canal.

The hearing device 600 may also include a user interface with a user control interface 627 operatively coupled to the processor 620. The user control interface 627 is configured to receive an input from the wearer of the hearing device 600. The input from the wearer can be any type of user input, such as a touch input, a gesture input, or a voice input. The user control interface 627 may be configured to receive an input from the wearer of the hearing device 600.

The hearing device 600 also includes a gain margin prediction deep neural network 638 operably coupled to the processor 620. The neural network 638 can be implemented in software, hardware (e.g., specialized neural network logic circuitry, general purpose processor), or a combination of hardware and software. During operation of the hearing device 600, the neural network 638 can be used to predict gain margin to assist in reducing the onset of feedback under different conditions as described above. The neural network 638 operates on discretized audio signals and may also receive other signals indicative of feedback inducing events, such as indicated by non-audio sensors 634.

The hearing device 600 can include one or more communication devices 636. For example, the one or more communication devices 636 can include one or more radios coupled to one or more antenna arrangements that conform to an IEEE 802.6 (e.g., Wi-Fi®) or Bluetooth® (e.g., BLE, Bluetooth® 4.2, 5.0, 5.1, 5.2 or later) specification, for example. In addition, or alternatively, the hearing device 600 can include a near-field magnetic induction (NFMI) sensor (e.g., an NFMI transceiver coupled to a magnetic antenna) for effecting short-range communications (e.g., ear-to-ear communications, ear-to-kiosk communications). The communications device 636 may also include wired communications, e.g., universal serial bus (USB) and the like.

The communication device 636 is operable to allow the hearing device 600 to communicate with an external computing device 604, e.g., a smartphone, laptop computer, etc. The external computing device 604 includes a communications device 606 that is compatible with the communications device 636 for point-to-point or network communications. The external computing device 604 includes its own processor 608 and memory 610, the latter which may encompass both volatile and non-volatile memory. The external computing device 604 includes a neural network trainer/updater 612 that may train one or more neural networks and/or prepare networks for updating the hearing device 600 (e.g., download an updated network configuration via a wide area network). The trained network parameters (e.g., weights, configurations) can be uploaded to the hearing device 600 and loaded into to the neural network 638 of the hearing device 600 to operate as described above.

The hearing device 600 also includes a power source, which can be a conventional battery, a rechargeable battery (e.g., a lithium-ion battery), or a power source comprising a supercapacitor. In the embodiment shown in FIG. 5, the hearing device 600 includes a rechargeable power source 624 which is operably coupled to power management circuitry for supplying power to various components of the hearing device 600. The rechargeable power source 624 is coupled to charging circuitry 626. The charging circuitry 626 is electrically coupled to charging contacts on the housing 602 which are configured to electrically couple to corresponding charging contacts of a charging unit when the hearing device 600 is placed in the charging unit.

This document discloses numerous example embodiments, including but not limited to the following:

Example 1 is a hearing device, comprising: a microphone that produces an audio input signal; a loudspeaker that outputs an amplified audio signal into an ear canal; a signal processing path coupled to the microphone and the loudspeaker. The signal processing path comprises: a deep neural network configured to predict an instantaneous gain margin of the hearing device based on a set of inputs comprising: a first parameter of the audio input signal, a second parameter of the amplified audio signal, and a gain of the signal processing path; and a feedback reduction module that receives the predicted instantaneous gain margin and adjusts feedback reduction parameters to reduce an onset of feedback in the hearing device.

Example 2 includes the hearing device of example 1, wherein the feedback reduction module comprises an adaptive filter, the predicted instantaneous gain margin used to adjust a step size of the adaptive filter. Example 3 includes the hearing device of example 2, wherein the deep neural network is configured to predict the instantaneous gain margin further based on coefficients of the adaptive filter. Example 4 includes the hearing device of example 2 or 3, wherein the step size decreases in response to a decrease in the predicted instantaneous gain margin and wherein the step size increases in response to an increase in the predicted instantaneous gain margin. Example 5 includes the hearing device of any one of examples 2, 3 or 4, wherein the feedback reduction module further decreases the gain in response to the decrease in the predicted instantaneous gain margin and increases the gain in response to the increase the predicted instantaneous gain margin.

Example 6 includes the hearing device of example 1, wherein the feedback reduction module decreases the gain in response to a decrease in the predicted instantaneous gain margin and increases the gain in response to an increase the predicted instantaneous gain margin. Example 7 includes the hearing device of any previous example, wherein the deep neural network comprises a recurrent neural network. Example 8 includes the hearing device of example 7, wherein the recurrent neural network comprises a long short-term memory (LSTM) layer. Example 9 includes the hearing device of example 8, wherein the recurrent neural network comprises, in order from an input layer to an output layer: the input layer; the LSTM layer; a first dropout layer; a first fully connected layer; a second dropout layer; a second fully connected layer; and the output layer.

Example 10 includes the hearing device of any previous example, wherein the deep neural network is configured to predict the instantaneous gain margin further based on input from an acceleration sensor of the hearing device. Example 11 includes the hearing device of any previous example, wherein the first and second parameters respectively comprise weighted overlap-add (WOLA) frames of the audio input signal and the amplified audio signal. Example 12 includes the hearing device of any previous example, wherein the deep neural network outputs the predicted instantaneous gain margin as two or more gain margins for two or more associated frequency bands. Example 13 includes the hearing device of any previous example, wherein the set of inputs are synchronized to a common sampling rate.

Example, 14 is method comprising: receiving an audio input signal from a microphone of a hearing device; receiving an amplified audio signal sent to a loudspeaker of the hearing device; determining a gain of a signal processing path that outputs the amplified audio signal based on the audio input signal; inputting into a deep neural network a set of inputs comprising: a first parameter of the audio input signal, a second parameter of the amplified audio signal, and the gain of the signal processing path; determining a predicted instantaneous gain margin from the deep neural network in response to the set of inputs; and reducing an onset of feedback in the hearing device using the predicted instantaneous gain margin.

Example 15 includes the method of example 14, wherein reducing the onset of the feedback in the hearing device comprises cancelling the feedback via an adaptive filter, the predicted instantaneous gain margin used to adjust a step size of the adaptive filter. Example 16 includes the method of example 15, wherein the deep neural network is configured to predict the instantaneous gain margin further based on coefficients of the adaptive filter. Example 17 includes the method of example 15 or 16, wherein the step size decreases in response to a decrease in the predicted instantaneous gain margin and wherein the step size increases in response to an increase in the predicted instantaneous gain margin. Example 18 includes the method of example 15, 16, or 17, wherein reducing the onset of the feedback in the hearing device further comprises decreasing the gain in response to the decrease in the predicted instantaneous gain margin and increases the gain in response to the increase the predicted instantaneous gain margin.

Example 19 includes the method of example 14, wherein reducing the onset of the feedback in the hearing device further comprises decreasing the gain in response to a decrease in the predicted instantaneous gain margin and increases the gain in response to an increase the predicted instantaneous gain margin. Example 20 includes the method of any one of examples 14-19, wherein the deep neural network comprises a recurrent neural network. Example 21 includes the method of example 20, wherein the recurrent neural network comprises a long short-term memory (LSTM) layer. Example 22 includes the method of example 21, wherein the recurrent neural network comprises, in order from an input layer to an output layer: the input layer; the LSTM layer; a first dropout layer; a first fully connected layer; a second dropout layer; a second fully connected layer; and the output layer.

Example 23 includes the method of any one of examples 14-22, wherein the deep neural network is configured to predict the instantaneous gain margin further based on input from an acceleration sensor of the hearing device. Example 24 includes the method of any one of examples 14-23, wherein the first and second parameters respectively comprise weighted overlap-add (WOLA) frames of the audio input signal and the amplified audio signal. Example 25 includes the method of any one of examples 14-24, wherein the deep neural network outputs the predicted instantaneous gain margin as two or more gain margins for two or more associated frequency bands. Example 26 includes the method of any one of examples 14-24, wherein the set of inputs are synchronized to a common sampling rate.

Example 27 is method comprising: simulating a hearing device using an analytical model, the analytical model comprising: first parameters of an audio input signal from a microphone of the hearing device; second parameters of an amplified audio signal sent to a loudspeaker of the hearing device; gains of a signal processing path that outputs the amplified audio signal from the hearing device based on the audio input signal; adaptive filter coefficients of an adaptive feedback controller of the hearing device; and an impulse response of a feedback path of the hearing device. The method further involves repeatedly performing an optimization of a deep neural network until an error criterion is reached, the optimization comprising: inputting the first parameters, the second parameters, the gains, and the adaptive filter coefficients into the deep neural network to obtain a predicted gain margin; determining a reference gain margin via the analytical model; determining an error in the predicted gain margin compared to the reference gain margin; and using the error to update the deep neural network. The optimized neural network is used for feedback control in the hearing device.

Example 28 includes the method of example 27, wherein determining the error comprises determining a weighted mean-square error. Example 29 includes the method of example 27 or 28, wherein the deep neural network comprises a recurrent neural network. Example 30 includes the method of example 29, wherein the recurrent neural network comprises a long short-term memory (LSTM) layer. Example 31 includes the method of example 30, wherein the recurrent neural network comprises, in order from an input layer to an output layer: the input layer; the LSTM layer; a first dropout layer; a first fully connected layer; a second dropout layer; a second fully connected layer; and the output layer. Example 32 includes the method of any one of examples 27-31, wherein the analytical model further comprises a third parameter of an acceleration sensor of the hearing device, the third parameter also input into the deep neural network to obtain the predicted gain margin. Example 33 includes the method of any one of examples 27-32, wherein the first and second parameters respectively comprise weighted overlap-add (WOLA) frames of the audio input signal and the amplified audio signal. Example 34 includes the method of any one of examples 27-33, wherein the deep neural network outputs the gain margin prediction as two or more gain margins for two or more associated frequency bands.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A hearing device, comprising:

a microphone that produces an audio input signal;

a loudspeaker that outputs an amplified audio signal into an ear canal;

a signal processing path coupled to the microphone and the loudspeaker, the signal processing path comprising:

a deep neural network configured to predict an instantaneous gain margin of the hearing device based on a set of inputs comprising: a first parameter of the audio input signal, a second parameter of the amplified audio signal, and a gain of the signal processing path; and a feedback reduction module that receives the predicted instantaneous gain margin and adjusts feedback reduction parameters to reduce an onset of feedback in the hearing device.

2. The hearing device of claim 1, wherein the feedback reduction module comprises an adaptive filter, the predicted instantaneous gain margin used to adjust a step size of the adaptive filter.

3. The hearing device of claim 2, wherein the deep neural network is configured to predict the instantaneous gain margin further based on coefficients of the adaptive filter.

4. The hearing device of claim 2, wherein the step size decreases in response to a decrease in the predicted instantaneous gain margin and wherein the step size increases in response to an increase in the predicted instantaneous gain margin.

5. The hearing device of claim 2, wherein the feedback reduction module further decreases the gain in response to the decrease in the predicted instantaneous gain margin and increases the gain in response to the increase the predicted instantaneous gain margin.

6. The hearing device of claim 1, wherein the feedback reduction module decreases the gain in response to a decrease in the predicted instantaneous gain margin and increases the gain in response to an increase the predicted instantaneous gain margin.

7. The hearing device of claim 1, further comprising a memory storing individual acoustic feedback path information that is obtained from a measurement on an ear of a user of the hearing device, the set of inputs to the deep neural network further comprising the individual acoustic feedback path information.

8. The hearing device of claim 1, wherein the deep neural network comprises a recurrent neural network.

9. The hearing device of claim 8, wherein the recurrent neural network comprises, in order from an input layer to an output layer: the input layer; a long short-term memory layer; a first dropout layer; a first fully connected layer; a second dropout layer; a second fully connected layer; and the output layer.

10. The hearing device of claim 1, wherein the deep neural network is configured to predict the instantaneous gain margin further based on input from an acceleration sensor of the hearing device.

11. The hearing device of claim 1, wherein the first and second parameters respectively comprise weighted overlap-add (WOLA) frames of the audio input signal and the amplified audio signal.

12. The hearing device of claim 1, wherein the deep neural network outputs the predicted instantaneous gain margin as two or more gain margins for two or more associated frequency bands.

13. The hearing device of claim 1, wherein the set of inputs are synchronized to a common sampling rate.

14. A method comprising:

receiving an audio input signal from a microphone of a hearing device;

receiving an amplified audio signal sent to a loudspeaker of the hearing device;

determining a gain of a signal processing path that outputs the amplified audio signal based on the audio input signal;

inputting into a deep neural network a set of inputs comprising: a first parameter of the audio input signal, a second parameter of the amplified audio signal, and the gain of the signal processing path;

determining a predicted instantaneous gain margin from the deep neural network in response to the set of inputs; and reducing an onset of feedback in the hearing device using the predicted instantaneous gain margin.

15. The method of claim 14, wherein reducing the onset of the feedback in the hearing device comprises cancelling the feedback via an adaptive filter, the predicted instantaneous gain margin used to adjust a step size of the adaptive filter.

16. The method of claim 15, wherein the deep neural network is configured to predict the instantaneous gain margin further based on coefficients of the adaptive filter.

17. The method of claim 15, wherein the step size decreases in response to a decrease in the predicted instantaneous gain margin and wherein the step size increases in response to an increase in the predicted instantaneous gain margin.

18. The method of claim 15, wherein reducing the onset of the feedback in the hearing device further comprises decreasing the gain in response to the decrease in the predicted instantaneous gain margin and increases the gain in response to the increase the predicted instantaneous gain margin.

19. The method of claim 14, wherein reducing the onset of the feedback in the hearing device further comprises decreasing the gain in response to a decrease in the predicted instantaneous gain margin and increases the gain in response to an increase the predicted instantaneous gain margin.

20. The method of a claim 14, wherein the deep neural network comprises, in order from an input layer to an output layer: the input layer; an LSTM layer; a first dropout layer; a first fully connected layer; a second dropout layer; a second fully connected layer; and the output layer.

* * * * *